United States Patent [19]
Fujiwara et al.

[11] Patent Number: 5,609,024
[45] Date of Patent: Mar. 11, 1997

[54] EXHAUST GAS PURIFICATION APPARATUS FOR INTERNAL COMBUSTION ENGINE

[75] Inventors: Toru Fujiwara; Tadashi Tsubakiji, both of Tokyo; Kenichi Tsuchiya, Kobe, all of Japan

[73] Assignee: Mitsubishi Denki Kabushiki Kaisha, Tokyo, Japan

[21] Appl. No.: 560,495

[22] Filed: Nov. 17, 1995

[30] Foreign Application Priority Data

Dec. 28, 1994 [JP] Japan ................................ 6-328580

[51] Int. Cl.⁶ .................................................. F01N 3/00
[52] U.S. Cl. .......................................... 60/284; 60/289
[58] Field of Search .......................... 60/284, 289, 286, 60/300

[56] References Cited

U.S. PATENT DOCUMENTS

| | | | |
|---|---|---|---|
| 3,802,194 | 4/1974 | Tanasawa et al. | 60/289 |
| 3,945,802 | 3/1976 | Eckert | 60/284 |
| 4,672,809 | 6/1987 | Cornelison et al. | 60/286 |
| 5,067,318 | 11/1991 | Arai | 60/286 |
| 5,090,200 | 2/1992 | Arai | 60/289 |
| 5,216,880 | 6/1993 | Aoki et al. | 60/286 |
| 5,367,875 | 11/1994 | Aboujaoude et al. | 60/286 |
| 5,388,404 | 2/1995 | Tsumura | 60/284 |
| 5,489,319 | 2/1996 | Tokuda et al. | 60/286 |
| 5,503,804 | 4/1996 | Fujishita et al. | 60/284 |
| 5,555,725 | 9/1996 | Shimasaki | 60/284 |

FOREIGN PATENT DOCUMENTS

| | | |
|---|---|---|
| 138714 | 8/1984 | Japan . |
| 1483033 | 8/1977 | United Kingdom . |

*Primary Examiner*—John T. Kwon
*Attorney, Agent, or Firm*—Sughrue, Mion, Zinn, Macpeak & Seas

[57] ABSTRACT

An exhaust gas purification apparatus for an internal combustion engine is capable of stably introducing secondary air and heating a catalyst at the same time without increasing an amount of discharge current from the battery. When the internal combustion engine 1 is started, the output terminal A of a generator 10 is electrically connected to the first contact 51 of a switching relay 50 through an output switching circuit 33 and the output terminal A of the generator 10 is electrically isolated from a second contact 52. As a result, when the internal combustion engine 1 is started, since a current output from the generator 10 is supplied to the motor 8 of a secondary air introduction unit 6 and the heating element 3 of a catalytic converter 4, the power of a battery 20 is consumed only by a plurality of electric loads and is not consumed by the motor 8 and the heating element 3.

7 Claims, 7 Drawing Sheets

EXHAUST GAS PURIFICATION APPARATUS FOR INTERNAL COMBUSTION ENGINE

BACKGROUND OF THE INVENTION

1. Field of the Invention

The present invention relates to an exhaust gas purification apparatus for internal combustion engine provided with a catalytic converter and a secondary air introduction system.

2. Description of the Related Art

In general, a gas exhaust system of automobiles removes harmful components in an exhaust gas by a catalytic converter mounted to an exhaust gas pipe. That is, harmful components are purified in such a manner that when exhaust gas passes through the catalyst in the catalytic converter, the harmful components (CO, HC, NOx) in the exhaust gas are caused to make an oxidation reaction and reduction reaction by the catalyst.

A purification ratio achieved by these reactions changes depending upon an exhaust gas temperature and an air fuel ratio which is a ratio of fuel to air to be supplied into an internal combustion engine. Further, if a ternary catalyst containing noble metal such as platinum, vanadium or the like is used as the catalyst, the purification ratio achieved by the catalytic converter is maximized when the catalytic converter is at a temperature in an ordinary operation region (activation temperature: about 400° C.) and the air fuel ratio is at a theoretical air fuel ratio.

However, when the internal combustion engine is not yet sufficiently warmed up (in a warming-up period) such as when it is just after being started, since the temperature of the catalyst is less than the above activation temperature and further the air fuel ratio is in a fuel rich range, a satisfactory purification ratio cannot be obtained to harmful components.

There are conventionally known an electric vehicle heating apparatus incorporating an electric heater for catalytic converter and an electrically-driven type secondary air introduction apparatus for supplying air to an exhaust gas pipe by an electrically-driven pump as technologies for solving the above problem.

Figure 8:
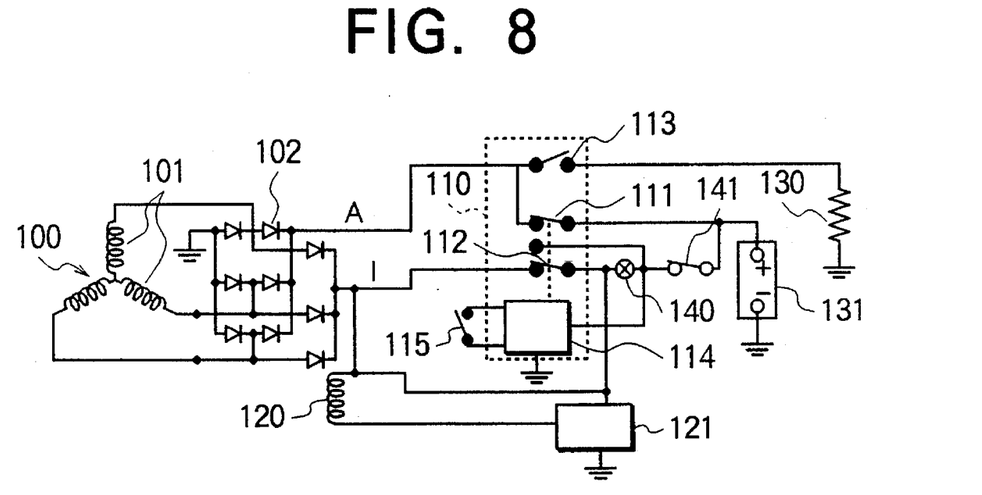
FIG. 8 is a circuit diagram showing a conventional electric heating apparatus for a vehicle.

As the conventional electric heating apparatus for a vehicle, there is a technology disclosed in Japanese Patent Publication No. 61-33735. FIG. 8 is a circuit diagram showing this apparatus. In FIG. 8, a generator, generally denoted at reference numeral 100, has a stator winding 101 connected to a controller 110 and a field winding 120 through a rectifier 102. A heating element 130, a battery 131 and an output adjusting means 121 are connected to the controller 110.

Further, the controller 110 is provided with first contacts 111,112, a second contact 113 and a control circuit 114.

The first contact 111 is interposed between the output terminal A of the rectifier 102 and the positive terminal of the battery 131. The first contact 112 is interposed between the rectifier 102 and the battery 131 with an end thereof connected to the output terminal I of the rectifier 102 and the other end connected to the positive terminal of the battery 131 through a charge alarm lamp 140 and a key switch 141. The other end of the first contact 112 is also connected to the field winding 120 through the output adjusting means 121.

The second contact 113 is interposed between the output terminal A of the rectifier 102 and the heating element 130.

Further, a control circuit 114 having a manual switch 115 is connected to the positive terminal of the battery 131.

Next, operation of the electric vehicle heating apparatus as constructed above will be described.

FIG. 8 shows that the positions of the respective contacts are in an ordinary charge control state and the heating element 130 is not heated.

In this state, an output from the stator winding 101 generated by supplying power to the field winding 120 is smoothed by the rectifier 102, supplied to the battery 131 from the output terminal A of the rectifier 102 through the first contact 111 and charges the battery 131.

Note, the power supplied to the field winding 120 is adjusted by the output adjusting means 121. More specifically, the output adjusting means 121 senses a voltage at the positive terminal of the battery 131 through the charge alarm lamp 140 and key switch 141 and when the terminal voltage is smaller than a predetermined set voltage (e.g. 14.5 V), an amount of a current to the field winding 120 is increased to increase an output of the stator winding 101. Thereafter, the voltage at the positive terminal of the battery 131 is increased by the increase of the output from the stator winding 101 and when the output reaches the above set voltage, the power supplied to the field winding 120 is stopped.

As described above, the voltage charged to the battery 131 is controlled constant by changing an amount of the current to the field winding 120 by comparing the voltage at the positive terminal of the battery 131 with the set voltage by the output adjusting means 121.

When the heating element 130 is placed in an operation start condition from the ordinary charge control state by turning on the manual switch 115 and second contact 113, the first contacts 111, 112 are turned off by the control circuit 114 of the controller 110.

With this arrangement, since the battery 131 is isolated from the output terminal A of the generator 100, the voltage at the positive terminal of the battery 131 is set to an open terminal voltage (about 12 V) and made lower than the set voltage (14.5 V). As a result, although the output adjusting means 121 increases the field current of the field winding 120, since a charging circuit is isolated by the first contact 111, the positive terminal voltage of the battery 131 does not increase and the field winding 120 is finally in a maximum excited state (fully excited).

Since only the electric load connected to the generator 100 is the heating element 130 here, the generator 100 entirely supplies a maximum output to the heating element 130 so that the heating element 130 is abruptly heated. While the heating element 130 is abruptly heated, power to be supplied to vehicle-mounted loads other than the heating element 130 is previously charged to the battery 131.

Figure 9:
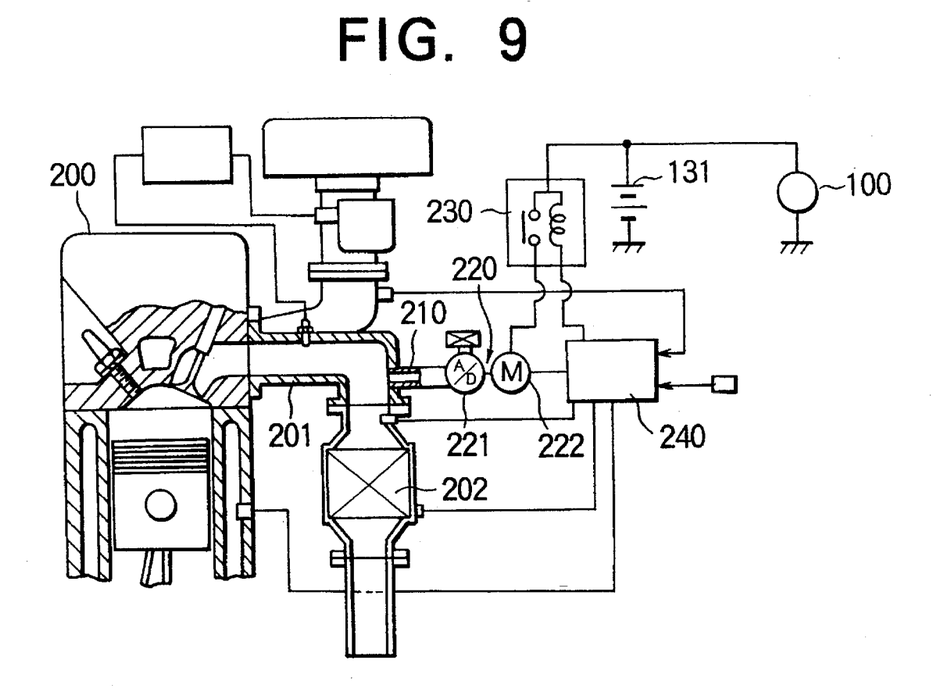
FIG. 9 is a circuit diagram showing a conventional electrically-driven type secondary air introduction apparatus.

On the other hand, there is a technology disclosed in Japanese Patent Application Laid-Open No. 59-138714 as the conventional electrically-driven type secondary air introduction apparatus. FIG. 9 is a circuit diagram showing the apparatus.

In FIG. 9, an internal combustion engine has a cylinder 200 and an exhaust gas pipe 201 connected to a side wall of the cylinder 200. A catalytic converter 202 is inserted in the exhaust gas pipe 201 and a secondary air passage 210 is connected to the exhaust gas pipe 201 at a location upstream of the catalytic converter 202.

A secondary air pumping unit 220 comprising a pump 221 and a motor 222 is mounted to the secondary air passage 210. The motor 222 of the secondary air pumping unit 220 is connected to the battery 131 and a generator 100 through a secondary air relay 230 and controlled by a secondary air control circuit 240.

With this arrangement, the secondary air control circuit 240 supplies power to the exiting coil of the secondary air relay 230 and turns on the contact of the secondary air relay 230 after it confirms secondary air introducing conditions through information from various sensors. As a result, currents (e.g. 20 A) are supplied from the generator 100 and the battery 131 to the motor 222 through the contact of the secondary air relay 230 to rotate it. Air discharged from the pump 221 is supplied into the exhaust gas pipe 201 through the secondary air passage 210 by the rotation of the motor 222.

Incidentally, to cope with the recent strengthened regulation to an exhausted gas, harmful components must by further purified in a warming-up period. For this purpose, it is contemplated to use the electric vehicle heating apparatus and electrically-driven type secondary air introduction apparatuses shown in FIG. 8 and FIG. 9 in combination and operate them just after the start of a vehicle.

When these apparatuses are operated from just after the start of the vehicle, however, entire power needed by electric loads other than the heating element 130 is supplied from the battery 131 while the catalytic converter is abruptly heated by the heating element 130 in the electric heating apparatus. Thus, when secondary air is introduced by the electrically-driven type secondary air introduction apparatus during this period, the power from the battery 131 is greatly consumed by the motor 222 of the secondary air pumping unit 220 and the life of the battery 131 is greatly shortened. Further, since the voltage of the battery 131 lacks when the vehicle is started, the vehicle may cause engine stall. Further, since the power of the battery 131 is greatly consumed by the motor 222 of the secondary air pumping unit 220 before or after the abrupt heating of the catalyst, a problem also arises in that a voltage supplied to other general electric loads changes abruptly.

When the battery 131 having a large capacity is used to avoid these problems, there arise problems of the increased cost of manufacture and the increased overall size of the apparatus.

SUMMARY OF THE INVENTION

Accordingly, the present invention is intended to solve the aforesaid problems and has for its object to provide an exhaust gas purification apparatus for an internal combustion engine which is capable of simultaneously realizing the stable introduction of secondary air and the heating of a catalyst without increasing the amount of discharge current from a battery and thus without using a battery of a large capacity.

To achieve the above object, an exhaust gas purification apparatus for internal combustion engine according to the present invention comprises a catalytic converter disposed in the exhaust gas pipe of an internal combustion engine for purifying an exhaust gas, a heating element for heating the catalytic converter, a secondary air passage connected to the exhaust gas pipe upstream of the catalytic converter, secondary air introduction means having a pump for supplying secondary air to the secondary air passage and a motor for driving the pump, a generator having a stator winding and a field winding and driven by the internal combustion engine, output adjusting means for controlling the field current of the field winding to thereby adjusting the current output from the generator, a switching relay having a first contact connected to both of the motor of the secondary air introduction means and the heating element and a second contact connected to a battery and electric loads other than the motor and the heating element, and output switching means for controlling the switching relay so that the output terminal of the generator is electrically connected to the first contact and the output terminal of the generator is eclectically isolated from the second contact when the internal combustion engine is started. With this arrangement, the current output from the generator is supplied to the motor and heating element and the power of the battery is not consumed by the motor and heating element. Accordingly, the secondary air introduction means can be energized and a catalyst can be heated at the same time without increasing an amount of discharge current from the battery.

In a preferred form of the invention, the output adjusting means is arranged to gradually increase and decrease the field current when the field current of the field winding rises up and falls down. Thus, the field current of the field winding is controlled by the output adjusting means so that the current is gradually increased and decreased at the rising-up and falling-down thereof, whereby the secondary air introduction means and catalytic converter can be started and heated gently, respectively as well as an adverse effect on the electric loads caused by the abrupt change of the field current can be also prevented.

In another preferred form of the invention, the exhaust gas purification apparatus further comprises an internal combustion engine controller for controlling the number of revolutions per minute of the internal combustion engine and a voltage sensing means for sensing the voltage at the first contact of the above switching relay and controlling the number of revolutions per minute of the internal combustion engine controller so that the voltage is kept constant.

According to the above arrangement, power can be stably supplied to the heating element and the motor of the secondary air introduction means, which result in a stable exhaust gas purification ratio.

In a further preferred form of the invention, the exhaust gas purification apparatus further comprises a voltage sensing means for sensing the voltage at the first contact of the above switching relay and controlling the field current of the field winding of the generator so that the voltage is kept constant. Thus, power can be stably supplied to the heating element of the catalytic converter and the motor of the secondary air introduction means, which result in a stable exhaust gas purification ratio.

In a further preferred form of the invention, the exhaust gas purification apparatus further includes a current sensing means for sensing the current from the generator and a motor control means interposed between the first contact of the switching relay and the motor of the secondary air introduction means for keeping a current to the motor to a predetermined value based on the current of the generator sensed by the current sensing means. With this arrangement, the stable quantity of flow of secondary air can be obtained at all times.

In a further preferred form of the invention, the exhaust gas purification apparatus further includes a voltage sensing means for sensing the voltage of the first contact of the switching relay and a quantity of flow variable means for changing the quantity of flow of secondary air introduced into the exhaust pipe from the secondary air passage in correspondence with the change of the voltage value sensed by the voltage sensing means. According to this arrangement, the quantity of flow of secondary air can be more stably obtained by directly changing the quantity of flow of secondary air introduced into the exhaust gas pipe from the secondary air passage by the quantity of flow variable means.

In a further preferred form of the invention, the motor comprises a DC brushless motor and there is provided a motor control means for controlling the r.p.m. of the DC brushless motor by controlling the voltage at the first contact of the switching relay based on the rotation signal of the DC brushless motor. With this arrangement, the quantity of flow of secondary air can be stably obtained at all times by controlling the r.p.m. of the DC brushless motor so that it is set to a desired r.p.m.

The above and other objects, features and advantages of the present invention will be more readily apparent from the ensuing detailed description of preferred embodiments of the invention when taken in conjunction with the accompanying drawings.

DESCRIPTION OF PREFERRED EMBODIMENTS

Embodiments of the present invention will be described below with reference to the accompanying drawings.

Embodiment 1

Figure 1:
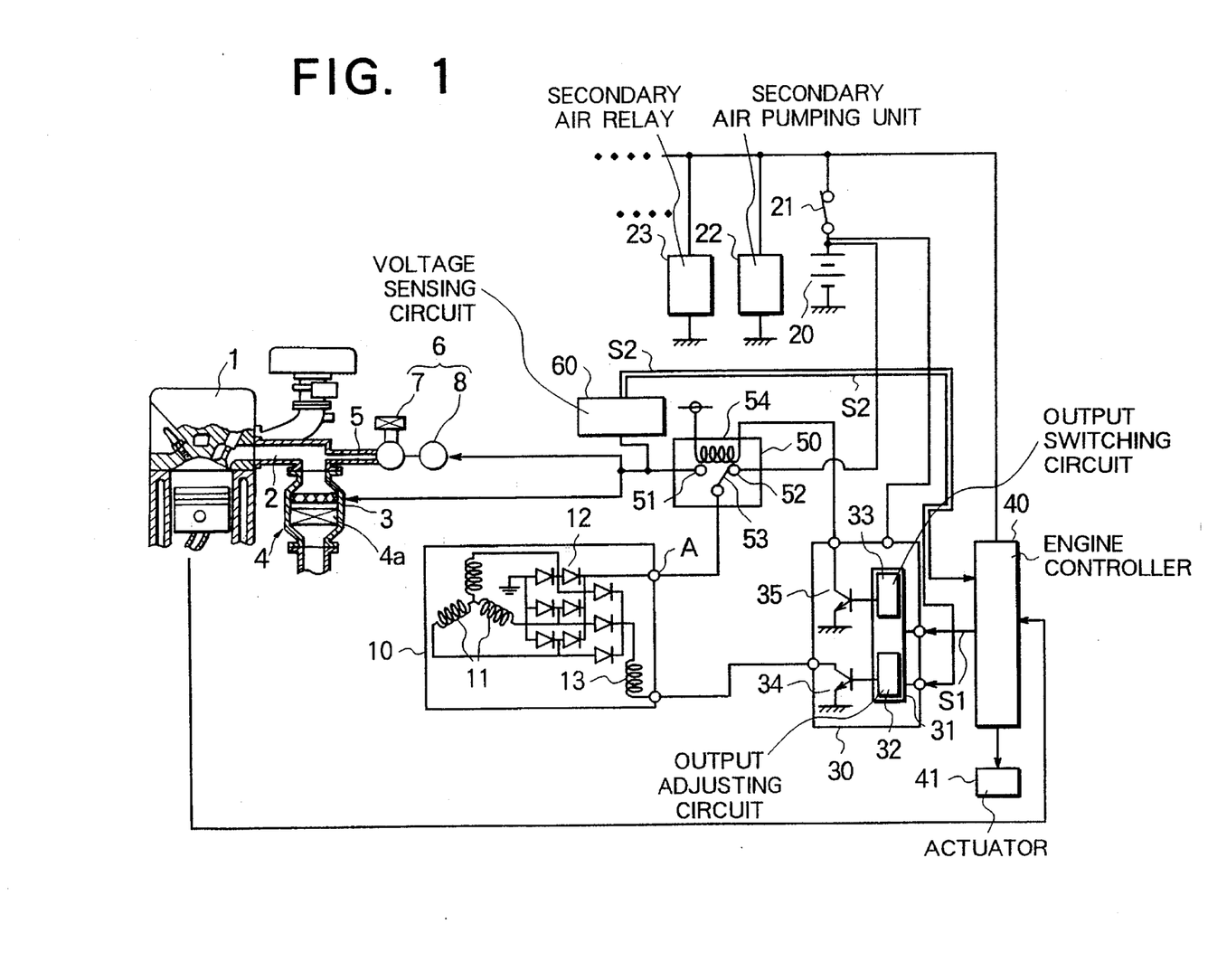
FIG. 1 is a block diagram showing an exhaust gas purification apparatus for internal combustion engine according to first through third embodiments of the present invention.

FIG. 1 shows an exhaust gas purification apparatus for internal combustion engine according to an embodiment 1 of the present invention.

In FIG. 1, an internal combustion engine, generally designated at reference numeral 1, includes an exhaust gas pipe 2 provided with a catalytic converter 4 disposed at the midway thereof, the catalytic converter 4 incorporating a heating element 3 and a catalyst 4a. A secondary air passage 5 is connected to the upstream side of the catalytic converter 4 and a secondary air introduction unit 6 (secondary air introduction means) is mounted to the secondary air passage 5. There are also provided a generator 10 driven by the internal combustion engine 1 and a battery 20 to be charged by the generator 10. Further, there is provided a switching relay 50 and a current output from the generator 10 is supplied to the internal combustion engine 1 or to the battery 20 by the switching operation effected to the switching relay 50 by an exhaust gas controller 30. An internal combustion engine controller 40 for controlling the r.p.m. of the internal combustion engine 1 is electrically connected to the exhaust gas controller 30.

The catalyst 4 is a material for removing harmful components in an exhaust gas and heated by the heating element 3 mounted above it.

The secondary air introduction unit 6 is composed of a pump 7 for supplying secondary air into the secondary air passage 5 and a motor 8 for driving the pump 7 disposed to the secondary air passage 5.

On the other hand, the generator 10 is composed of a stator winding 11, a rectifier 12 and a field winding 13. A key switch 21 is connected to the positive terminal of the battery 20 which is connected to the generator 10 through the switching relay 50 and a plurality of electric loads 22, 23 . . . are connected to the battery 20 through the key switch 21.

The exhaust gas controller 30 is provided with a switch control circuit 31 including an output adjusting circuit 32 as an output adjusting means and an output switching circuit 33 as an output switching means and the switch control circuit 31 is electrically connected to the internal combustion engine controller 40.

The output adjusting circuit 32 is a circuit for controlling the field current of the field winding 13 through a transistor 34.

More specifically, the output adjusting circuit 32 senses a voltage at the positive terminal of the battery 20 and when the positive terminal voltage is lower than a set voltage (e.g. 14.5 V), the output adjusting circuit 32 turns on the transistor 34 and increases a current output from the output terminal A of the generator 10. The output adjusting circuit 32 has such a function that when the positive terminal voltage of the battery 20 reaches the set voltage thereafter by the increase of the output current, the output adjusting circuit 32 turns off the transistor 34 and stops a power supply from the stator winding 11 to the field winding 13.

As described above, the output adjusting circuit 32 sets a voltage charged to the battery 20 to the above set voltage by comparing the positive terminal voltage of the voltage 20 with the set voltage and adjusting the magnitude of the field current (which is similar to a current output from the output terminal A) of the field winding 13.

The output adjusting circuit 32 also has a function that it automatically turns on the transistor 34 in a time t1 after the operation of a transistor 35 to be described later and maximizes the current output from the generator 10 by fully exciting the field winding 13. At the time, the output adjusting circuit increases the drive duty (on/off ratio) of the transistor 34 during a period of time until the field current of the field winding 13 reaches its maximum value and reduces the drive duty of the transistor 34 during a period of time until the maximum value is reduced to zero when the field current stops.

The output switching circuit 33 is a circuit for controlling the switching relay 50 and has a function for turning on/off the transistor 35.

More specifically, when an operation signal S1 is input from the internal combustion engine controller 40 to the switch control circuit 31, the output switching circuit 33 turns on the transistor 35 to supply power to the switching relay 50. Further, the output switching circuit 33 has a function for turning off the transistor 35 in a time t2 when the operation signal S1 is turned off.

Note, when the internal combustion engine controller 40 senses the start of the internal combustion engine 1, the operation signal S1 is output from the internal combustion engine controller 40 to the switch control circuit 31. Further, the internal combustion engine controller 40 has a function for operating a not shown timer incorporated therein after the start and determines that the start is finished in a predetermined period of time (or when the temperature of the catalyst 4a sensed by a not shown temperature sensor reaches a predetermined temperature) and turns off the operation signal S1.

The switching relay 50 includes a first contact 51 connected to both the motor 8 of the secondary air introduction unit 6 and the heating element 3 of the catalytic converter 4, a second contact 52 connected to the positive terminal of the battery 20, a switch 53 connected to the output terminal A of the generator 10 and an exciting coil 54 connected to the transistor 35 of the output switching circuit 33.

That is, the switch 53 is usually in contact with the second contact 52, and when the transistor 35 of the output switching circuit 33 is turned on, the exciting coil 54 is excited and the switch 53 is changed over to come into contact with the first contact 51.

Next, operation of this embodiment will be described.

Figure 2:
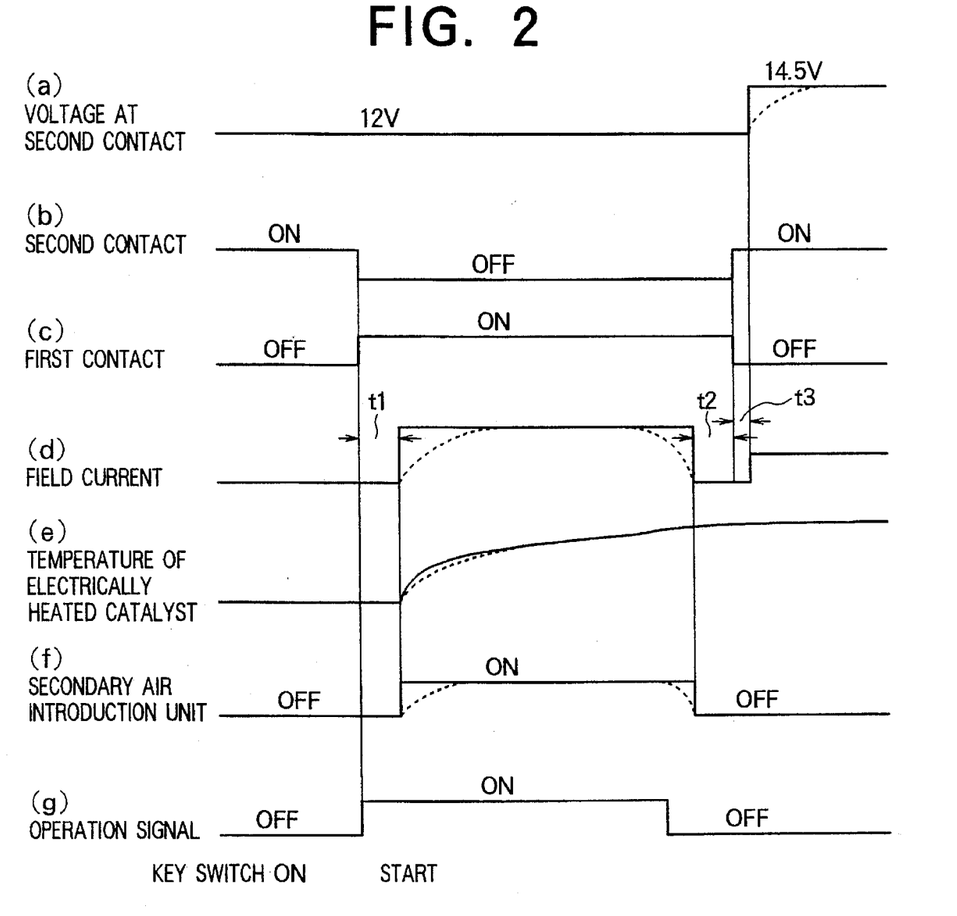
FIG. 2 is a timing chart of operation exhibited by the exhaust gas purification apparatus for internal combustion engine of FIG. 1, wherein (a) shows a voltage of a second contact, (b) shows operation of the second contact, (c) shows operation of the first contact, (d) shows a field current, (e) shows a temperature of a catalyst, (f) shows operation of a secondary air introduction apparatus, and (g) shows an operation signal.

FIG. 2 is a time chart showing the operation of this embodiment.

The state shown in FIG. 1 is an ordinary state with the key switch 21 turned on, the switch 53 in contact with the second contact 52 and the transistor 34 turned off. When the internal combustion engine 1 is started from this state by turning on the key switch 21 as shown in FIG. 2(g), the started state is sensed by the internal combustion engine controller 40 and the operation signal S1 is output to the switch control circuit 31 from the internal combustion engine controller 40.

When the operation signal S1 is input to the internal combustion engine controller 40, the transistor 35 is turned on by the output switching circuit 33 and power is supplied to the exciting coil 54 of the switching relay 50.

With this operation, the exciting coil 54 is excited and the switch 53 is turned on by being changed over to come into contact with the first contact 51 so that the second contact 52 is turned off, as shown in FIG. 2(b) and (c). Then, the transistor 34 is automatically turned on by the output adjusting circuit 32 in the period of the time t1 after the operation of the transistor 35 so that the field current of the field winding 13 is maximized and the current output from the generator 10 also maximized as shown in FIG. 2(d). At the time, however, since the drive duty of the transistor 34 is gradually increased until the field current reaches the maximum value, the field current is gradually increased until it reaches a maximum value as shown by the dotted line of FIG. 2(d).

As a result, since an output current corresponding to the field current flows from the output terminal A of the generator 10 to the motor 8 of the secondary air introduction unit 6 and the heating element 3 of the catalytic converter 4 and the motor 8 and heating element 3 are gently driven, the secondary air introduction unit 6 and catalyst 4a are gently driven and heated, respectively as shown by the dotted lines of FIG. 2(e) and (f).

When the above timer incorporated in the internal combustion engine controller 40 has measured a predetermined period of time after the start (or when the temperature of the catalyst 4a sensed by the temperature sensor has reached the predetermined temperature), the heating of the catalyst 4a by the heating element 3 is finished and the operation signal S1 output from the internal combustion engine controller 40 to the switch control circuit 31 is turned off.

With this operation, the drive duty of the transistor 34 is gradually increased under the control of the output adjusting circuit 32 and the transistor 34 is turned off in a predetermined period of time. As a result, the field current is gently decreased and stopped as shown by the dotted line of FIG. 2(d) and the secondary air introduction unit 6 is gently stopped as shown by the doted lines of FIG. 2(e) and (f).

Then, the transistor 35 is turned off under the control of the output switching circuit 33 in the time t2, the power supplied to the exciting coil 54 of the switching relay 50 is stopped and the switch 53 is changed over from the first contact 51 and comes into contact with the second contact 52. Thereafter, the transistor 34 is turned of under the control of the output adjusting circuit 32 in a time t3.

As a result, the switch 53 is changed over from the first contact 51 to the second contact 52 during the time t2+t3 in which the field current is stopped. This is because of that when the switch 53 is changed over at the time the field current is produced, that is, at the time the output current flows to the switch 53, there is a possibility that the first contact 51 and second contact 52 are deteriorated by sparking. That is, the first contact 51 and second contact 52 are protected by changing over the switch 53 during the period of time in which the current flowing to the switch 53 is stopped as in this embodiment. Note, the times t1 and t2 and the gradually increasing and decreasing times of the field current are set to ranges by which the purification ratio of the exhaust gas of the internal combustion engine 1 is not adversely affected.

As described above, when the transistor 34 is turned on in a state that the switch 53 is in contact with the second contact 52, a current output from the generator 10 flows to the battery 20 through the switch 53 and the battery 20 is charged up to the set voltage (14.5 V). As shown by the dotted line of FIG. 2(d), the field current is gradually increased at the rising-up thereof also at the time of charging.

Consequently, according to the exhaust gas purification apparatus for internal combustion engine of this embodiment, when the internal combustion engine 1 is started, since the motor 8 of the secondary air introduction unit 6 and the catalytic converter 4 are driven and heated, respectively using the current output from the generator 10 and the power of the battery 20 is not consumed by the secondary air introduction unit 6 and the catalytic converter 4, the life of the battery 20 can be increased. In addition, since the field current is gradually increased and decreased at the rising-up and falling-down thereof, the secondary air introduction unit 6 and catalytic converter 4 can be gently started and heated, respectively and further the adverse affect (such as, for example, flickering of a lamp and the like) of the field current to the electric loads 22, 23 . . . caused by the abrupt change of the field current can be prevented.

Embodiment 2

An exhaust gas purification apparatus for internal combustion engine of this embodiment is arranged by providing a voltage sensing circuit 60 as a voltage sensing means shown by the two-dot-and-dash line of FIG. 1 with the apparatus of the first embodiment.

More specifically, the voltage sensing circuit 60 is connected to the output of the first contact 51 of the switching relay 50 and the output terminal of the voltage sensing circuit 60 is connected to the internal combustion engine controller 40. Further, an actuator 41 is provided with the internal combustion engine controller 40 and the r.p.m. of the internal combustion engine 1 is controlled by the actuator 41.

With this arrangement, a voltage output from the generator 10 when it is started is sensed by the voltage sensing circuit 60 and a sensing signal S2 thereof is output to the internal combustion engine controller 40. Then, the internal combustion engine controller 40 controls the actuator 41 based on the sensing signal S2 so that an output voltage at the first contact 51 has a predetermined value.

Figure 3:
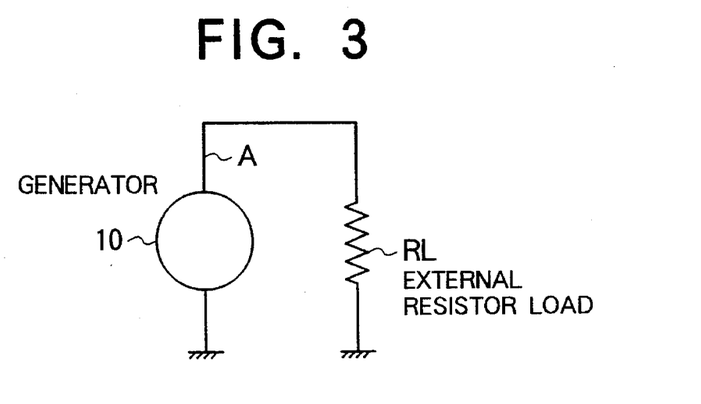
FIG. 3 is a circuit diagram showing how a generator is connected to an external resistor load.
Figure 4:
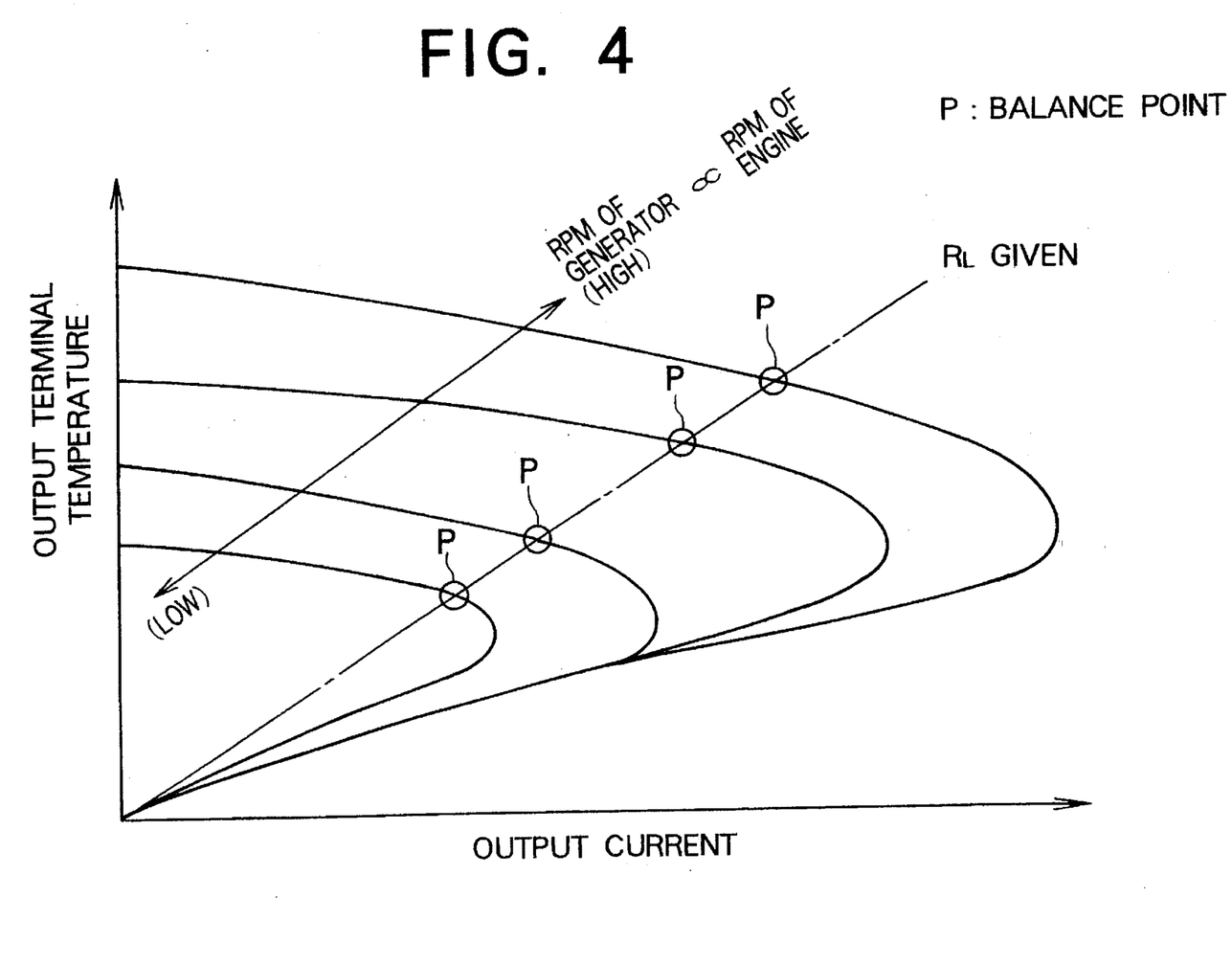
FIG. 4 is a graph showing an maximum output characteristic of the generator.

FIG. 3 is a circuit diagram showing the generator and an external resistor load and FIG. 4 is a graph showing a maximum output characteristic of the generator.

As shown in FIG. 3, it can be understood that all the electric loads connected to the output terminal A of the generator 10 is equivalent to an external load resistor RL. As shown in FIG. 4, since a current output from the output terminal A of the generator 10 changes in correspondence with the r.p.m. of the generator 10 (which is in proportion with the r.p.m. of the internal combustion engine 1 because the generator 10 is driven by the internal combustion engine 1), when a current is output from the generator 10 to the internal combustion engine 1, a voltage at the output of the first contact 51 also changes. As a result, even if the external resistor load RL of the generator 10 has a given value in FIG. 3, the balance point P thereof is changed by the change of the r.p.m. of the generator 10 (r.p.m. of the internal combustion engine 1) as shown in FIG. 4 and a voltage at the output of the first contact 51 is greatly changed accordingly.

This is because of that an engine r.p.m. in a warming-up process just after the start of the internal combustion engine 1 is determined in accordance with the temperature of engine cooling water and changes momentarily. Therefore, even if the motor 8 is driven and the heating element 3 is heated in a state that the r.p.m. of the internal combustion engine 1 changes, that is, in a state that a voltage output from the first contact 51 changes as described above, a desired amount of secondary air cannot be introduced into the secondary air passage 5 and the catalyst 4a cannot be heated to a desired temperature.

According to this embodiment, however, since the voltage output from the first contact 51 is sensed by the voltage sensing circuit 60 and the internal combustion engine controller 40 controls the actuator 41 so that the voltage output from the first contact 51 is set to a desired voltage, there can be obtained an effect that a voltage can be stably supplied to the heating element 3 of the catalytic converter 4 and the motor 8 of the secondary air introduction unit 6, which results in a stable exhaust gas purification ratio.

Since the other arrangements, functions and effects of this embodiment are the same as those of the first embodiment, they are not described here.

Embodiment 3

Although an exhaust gas purification apparatus for internal combustion engine of this embodiment also achieves an object similar to that of the second embodiment, since a sensing signal S2 from the voltage sensing circuit 60 is input to the switch control circuit 31 of the exhaust gas controller 30 as shown by the dot-dash-line of FIG. 1, the actuator 41 is not necessary.

That is, the sensing signal S2 from the voltage sensing circuit 60 is input to the switch control circuit 31 and the output adjusting circuit 32 controls the field current of the field winding 13 based on the sensing signal S2 so that the output from the first contact 51 is set to a desired voltage.

Since the other arrangements, functions and effects of this embodiment are the same as those of the second embodiment, they are not described here.

Embodiment 4

Figure 5:
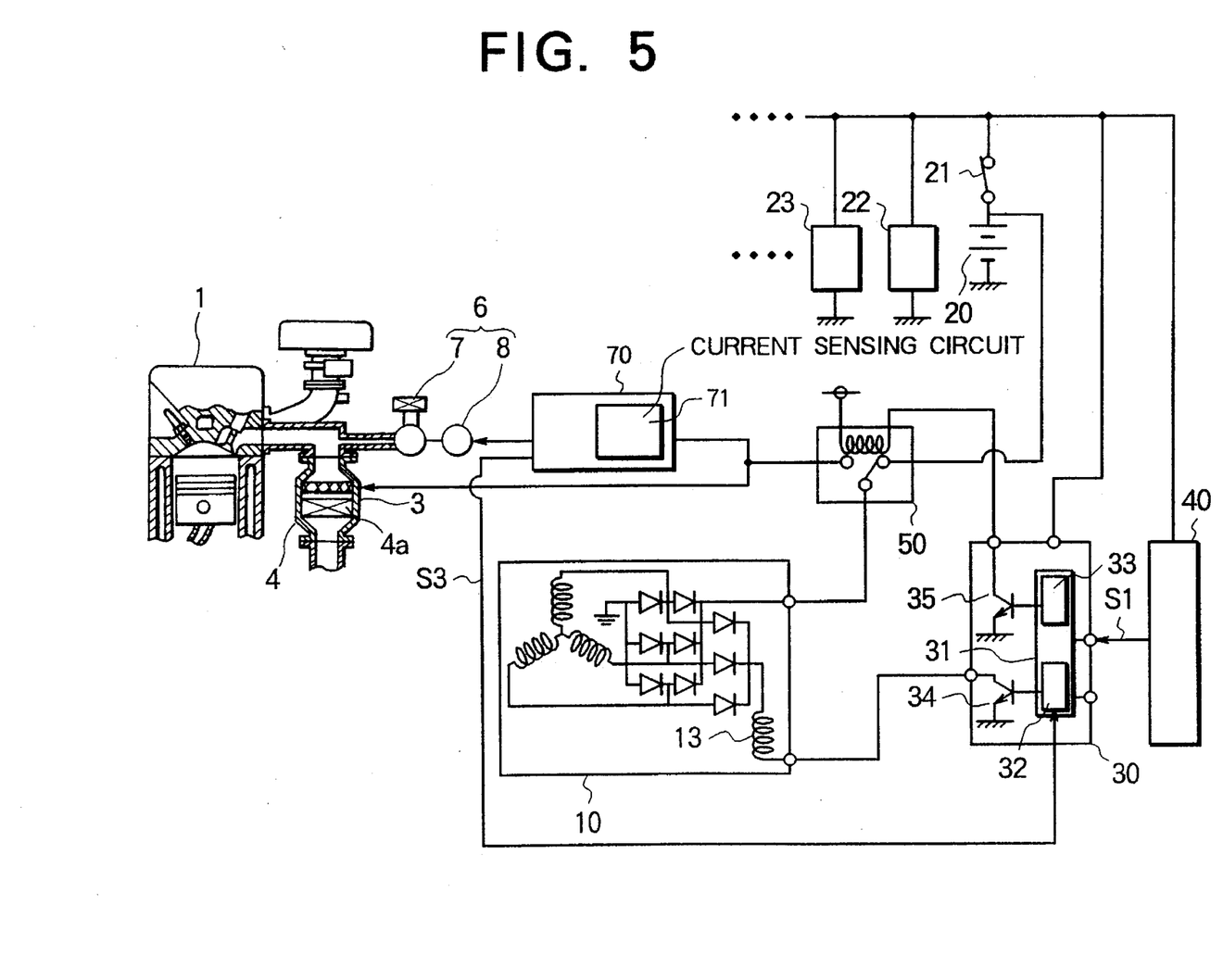
FIG. 5 is a block diagram showing an exhaust gas purification apparatus for internal combustion engine according to a fourth embodiment of the present invention.

FIG. 5 is a block diagram showing a fourth embodiment of the present invention.

As shown in FIG. 5, an exhaust gas purification apparatus for internal combustion engine of this embodiment includes a motor control circuit 70 as a motor control means for controlling a current flowing to the motor 8. The motor control circuit 70 is provided with a current sensing circuit 71(current sensing means) for sensing a current branched from the first contact 51 to the motor 8. The motor control circuit 70 outputs a control signal S3 for controlling the field winding 13 to the output adjusting circuit 32 based on a current sensed by the current sensing circuit 71 so that the current flowing to the motor 8 is has a desired current value.

With this arrangement, since the output adjusting circuit 32 controls the field current of the field winding 13 based on the control signal S3, the motor 8 can be driven at a desired r.p.m., and as a result a stable amount of secondary air can be supplied to the secondary air passage 5.

Since the other arrangements, functions and effects of this embodiment are the same as those of the second and third embodiments, they are not described here.

Embodiment 5

Figure 6:
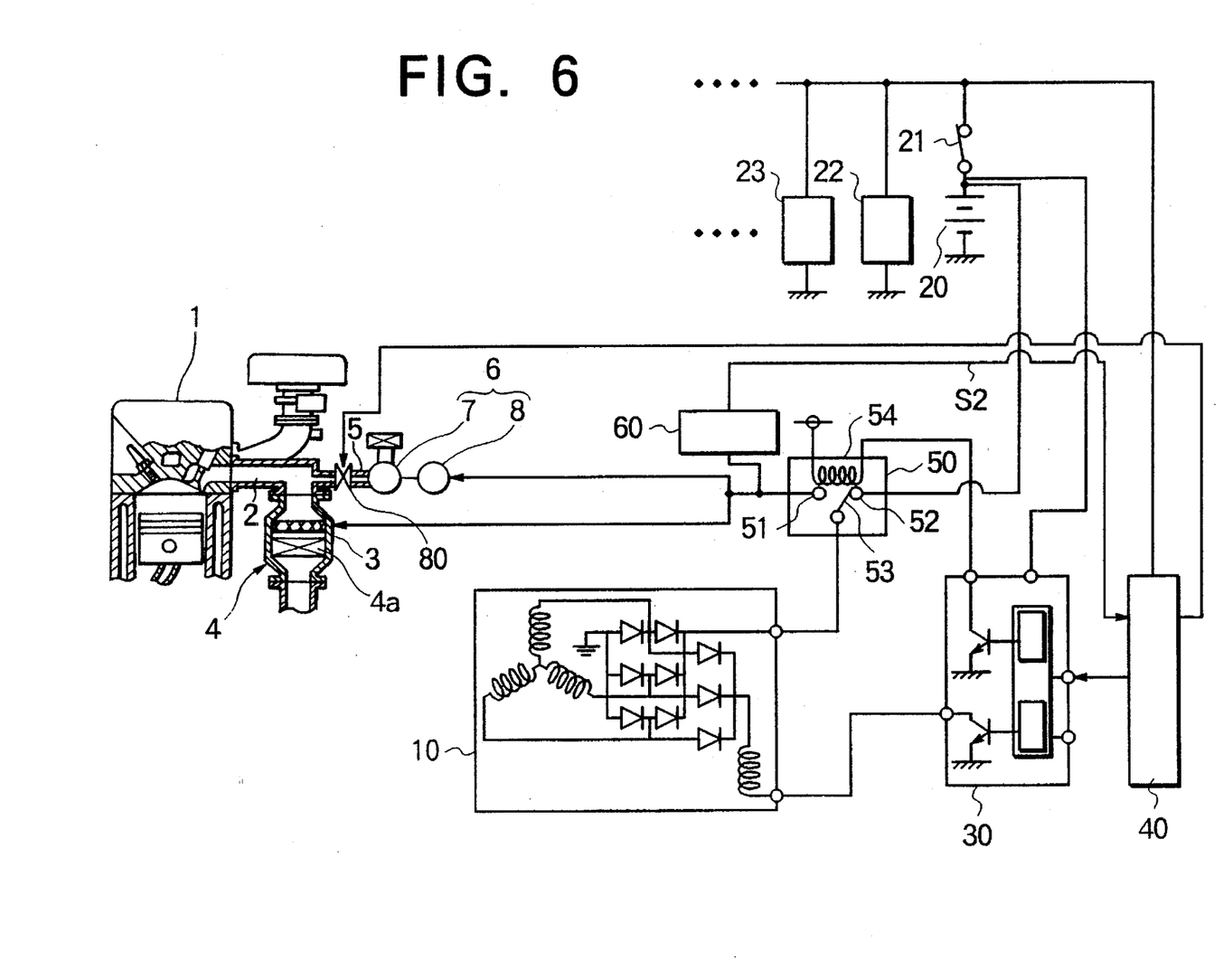
FIG. 6 is a block diagram showing an exhaust gas purification apparatus for internal combustion engine according to a fifth embodiment of the present invention.

FIG. 6 is a block diagram showing an exhaust gas purification apparatus for internal combustion engine according to a fifth embodiment of the present invention.

As shown in FIG. 6, the exhaust gas purification apparatus for internal combustion engine of this embodiment includes a voltage sensing circuit 60 for sensing a voltage output from the first contact 51 of the switching relay 50 and a valve 80 as a quantity of flow variable means for changing the quantity of flow of secondary air to be introduced from the secondary air passage 5 into the exhaust pipe 2 and the internal combustion engine controller 40 adjusts the opening/closing of the valve 80 based on the sensing signal S2 from the voltage sensing circuit 60.

That is, when the voltage output from the first contact 51 is greater than a desired value, the r.p.m. of the motor 8 is made excessively large and the quantity of flow of secondary air supplied into the secondary air passage 5 is increased. Thus, in this case the internal combustion engine controller 40 closes the valve 80 and reduces the diameter of the secondary air passage 5. On the contrary, when the voltage output from the first contact 51 is smaller than the desired value, the r.p.m. of the motor 8 is small and the quantity of flow of secondary air supplied into the secondary air passage 5 is not sufficient. Thus, in this case the internal combustion engine controller 40 opens the valve 80 and increases the diameter of the secondary air passage 5.

Since the other arrangements, functions and effects of this embodiment are the same as those of the fourth embodiment, they are not described here.

Embodiment 6

FIG. 6 shows an exhaust gas purification apparatus for internal combustion engine according to a sixth embodiment of the present invention.

Figure 7:
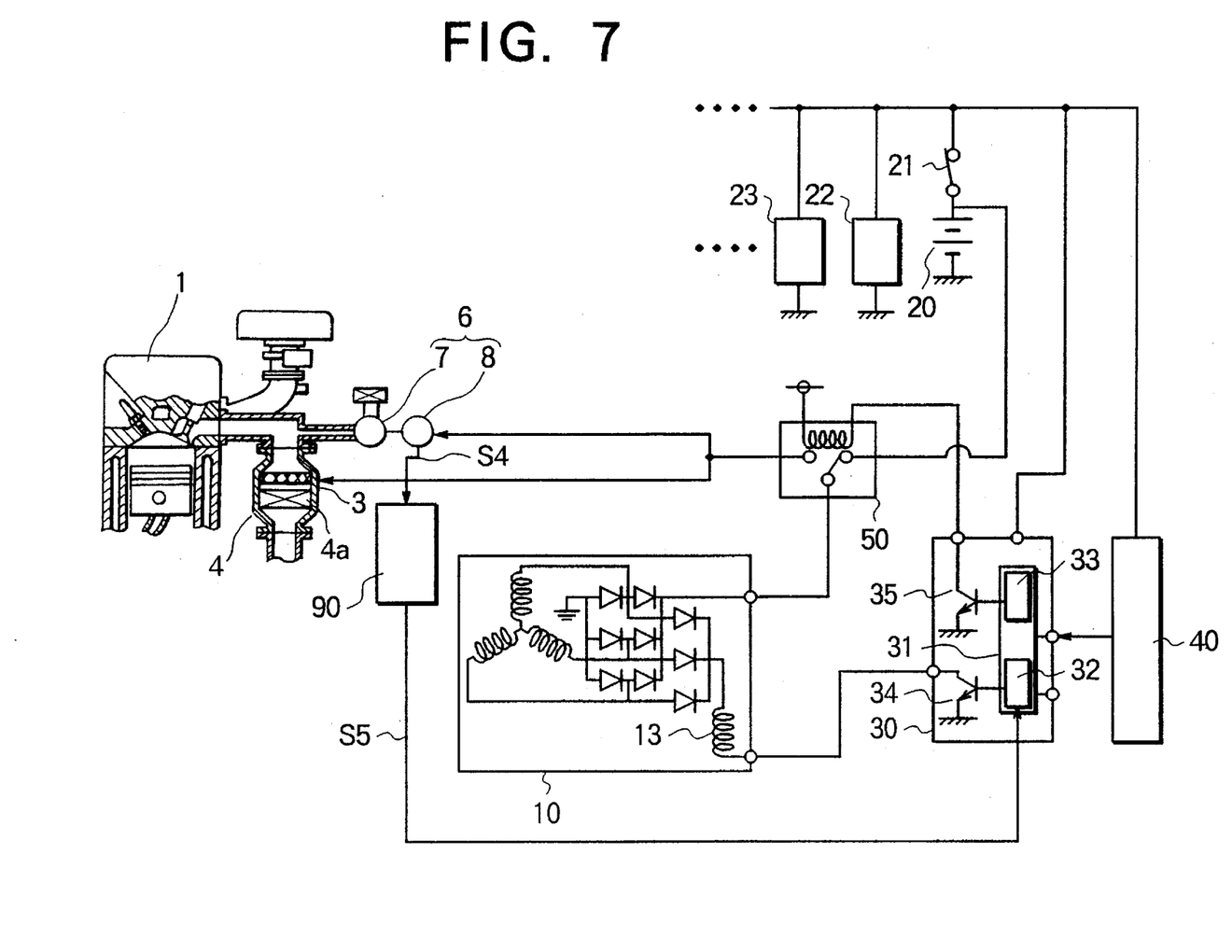
FIG. 7 is a block diagram showing an exhaust gas purification apparatus for internal combustion engine according to a sixth embodiment of the present invention.

As shown in FIG. 7, the exhaust gas purification apparatus for internal combustion engine of this embodiment composes the motor 8 of a DC brushless motor as well as includes a motor control circuit 90 as a motor control means and outputs a control signal S5 from the motor control circuit 90 to the output adjusting circuit 32.

That is, since the DC brushless motor has a function for sensing the r.p.m. of the rotary shaft thereof as its principle, the rotation signal S4 of the motor is input to the motor control circuit 90 and a control signal S5 is output to the output adjusting circuit 32 based on the rotation signal S4. The control signal S5 is a signal for controlling the field winding 13 so that the r.p.m. of the motor 8 has a desired value.

Since the other arrangements, functions and effects of this embodiment are the same as those of the fourth embodiment, they are not described here.

What is claimed is:

1. An exhaust gas purification apparatus for internal combustion engine, comprising:

a catalytic converter disposed in the exhaust gas pipe of an internal combustion engine for purifying an exhaust gas;

a heating element for heating said catalytic converter;

a secondary air passage connected to said exhaust gas pipe upstream of said catalytic converter;

secondary air introduction means having a pump for supplying secondary air to said secondary air passage and a motor for driving said pump;

a generator having a stator winding and a field winding and driven by said internal combustion engine;

output adjusting means for controlling the field current of said field winding to thereby adjusting the current output from said generator;

a switching relay having a first contact connected to both of the motor of said secondary air introduction means and said heating element and a second contact connected to a battery; and output switching means for controlling said switching relay so that the output terminal of said generator is electrically connected to said first contact and the output terminal of said generator is electrically isolated from said second contact when said internal combustion engine is started.

2. An exhaust gas purification apparatus for internal combustion engine according to claim 1 wherein when the field current of said field winding rises up and falls down, said output adjusting means gradually increases and decreases the field current.

3. An exhaust gas purification apparatus for internal combustion engine according to claim 1, further comprising:

an internal combustion engine controller for controlling the r.p.m. of said internal combustion engine; and voltage sensing means for sensing the voltage at the first contact of said switching relay and controlling the r.p.m. of said internal combustion engine controller so that the voltage is kept constant.

4. An exhaust gas purification apparatus for internal combustion engine according to claim 1, further comprising voltage sensing means for sensing the voltage at the first contact of said switching relay and controlling the field current of the field winding of said generator so that the voltage is kept constant.

5. An exhaust gas purification apparatus for internal combustion engine according to claim 1, further comprising:

current sensing means for sensing the current from said generator; and motor control means interposed between the first contact of said switching relay and the motor of said secondary air introduction means for keeping a current to said motor to a predetermined value based on the current of said generator sensed by said current sensing means.

6. An exhaust gas purification apparatus for internal combustion engine according to claim 1, further comprising:

voltage sensing means for sensing the voltage at the first contact of said switching relay; and quantity of flow variable means for changing the quantity of flow of secondary air introduced into said exhaust pipe from said secondary air passage in correspondence with the change of the voltage value sensed by said voltage sensing means.

7. An exhaust gas purification apparatus for internal combustion engine according to claim 1 further comprising said motor of a DC brushless motor and comprising motor control means for controlling the r.p.m. of said DC brushless motor by controlling the voltage at the first contact of said switching relay based on the rotation signal of said DC brushless motor.

* * * * *